US008914650B2

(12) United States Patent
Sistla et al.

(10) Patent No.: US 8,914,650 B2
(45) Date of Patent: *Dec. 16, 2014

(54) DYNAMICALLY ADJUSTING POWER OF NON-CORE PROCESSOR CIRCUITRY INCLUDING BUFFER CIRCUITRY

(75) Inventors: Krishnakanth Sistla, Beaverton, OR (US); Dean Mulla, Saratoga, CA (US); Vivek Garg, Folsom, CA (US); Mark Rowland, Beaverton, OR (US); Suresh Doraiswamy, San Jose, CA (US); Ganapati Srinivasa, Portland, OR (US); Jeffrey D. Gilbert, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 320 days.

This patent is subject to a terminal disclaimer.

(21) Appl. No.: 13/247,594

(22) Filed: Sep. 28, 2011

(65) Prior Publication Data

US 2013/0080795 A1    Mar. 28, 2013

(51) Int. Cl.
  *G06F 1/32* (2006.01)
  *G06F 13/40* (2006.01)

(52) U.S. Cl.
  CPC ............ *G06F 1/324* (2013.01); *G06F 13/4022* (2013.01)
  USPC ...................................................... 713/300

(58) Field of Classification Search
  CPC ..... G06F 5/06; G06F 9/3814; G06F 12/0862; G06F 1/324; G06F 3/0659; G06F 13/4022
  USPC ........................................................ 713/300
  See application file for complete search history.

(56) References Cited

U.S. PATENT DOCUMENTS

| 5,163,153 | A  | 11/1992 | Cole et al.   |
|-----------|----|---------|---------------|
| 5,522,087 | A  | 5/1996  | Hsiang        |
| 5,590,341 | A  | 12/1996 | Matter        |
| 5,621,250 | A  | 4/1997  | Kim           |
| 5,931,950 | A  | 8/1999  | Hsu           |
| 6,748,546 | B1 | 6/2004  | Mirov et al.  |

(Continued)

FOREIGN PATENT DOCUMENTS

EP    1 282 030 A1    5/2003

OTHER PUBLICATIONS

International Searching Authority, "Notification of Transmittal of the International Search Report and the Written Opinion of the International Searching Authority," mailed Mar. 4, 2013, in International application No. PCT/US2012/055702.

(Continued)

*Primary Examiner* — Thomas Lee
*Assistant Examiner* — Danny Chan
(74) *Attorney, Agent, or Firm* — Trop, Pruner & Hu, P.C.

(57) ABSTRACT

In one embodiment, the present invention includes a multi-core processor having a variable frequency domain including a plurality of cores and at least a portion of non-core circuitry of the processor. This non-core portion can include a cache memory, a cache controller, and an interconnect structure. In addition to this variable frequency domain, the processor can further have a fixed frequency domain including a power control unit (PCU). This unit may be configured to cause a frequency change to the variable frequency domain without draining the non-core portion of pending transactions. Other embodiments are described and claimed.

18 Claims, 8 Drawing Sheets

(56) References Cited

U.S. PATENT DOCUMENTS

| | | |
|---|---|---|
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,571,341 B2* | 8/2009 | Padwekar et al. ............ 713/502 |
| 7,730,340 B2 | 6/2010 | Hu et al. |
| 8,589,632 B1* | 11/2013 | Gupta et al. .................. 711/147 |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0060597 A1* | 3/2005 | Albonesi et al. ............. 713/600 |
| 2005/0132238 A1 | 6/2005 | Nanja |
| 2005/0166073 A1* | 7/2005 | Lee ............................... 713/300 |
| 2005/0235075 A1* | 10/2005 | Dijkhof et al. .................. 710/52 |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0234100 A1* | 10/2007 | Baker et al. ................... 713/600 |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0006894 A1* | 1/2009 | Bellofatto et al. ............. 714/34 |
| 2009/0138737 A1 | 5/2009 | Kim |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2010/0325469 A1* | 12/2010 | Yokoyama et al. ........... 713/600 |
| 2011/0022865 A1 | 1/2011 | Gunther |
| 2011/0113199 A1* | 5/2011 | Tang et al. .................... 711/130 |
| 2011/0154090 A1 | 6/2011 | Dixon et al. |
| 2013/0179716 A1 | 7/2013 | Sistla et al. |

OTHER PUBLICATIONS

Gunther, Steve, "Energy-Efficient Computing: Power Management System on The Nehalem Family of Processor," Intel Technology Journal, pp. 51, 57-62 and Fig. 5, 2010.

Hill, David L., "The Uncore: A Modular Approach to Feeding the High-Performance Cores," Intel Technology Journal, vol. 14, Issue 3, pp. 30-49, 2010.

U.S. Appl. No. 12/889,121, "Providing Per Core Voltage and Frequency Control," filed Sep. 23, 2010, by Pakaj Kumar.

SPEC—Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

Intel Developer Forum, IDF2010, Opher Kahn, et al., "Intel Next Generation Microarchitecture Codename Sandy Bridge: New Processor Innovations," Sep. 13, 2010, 58 pages.

* cited by examiner

DYNAMICALLY ADJUSTING POWER OF NON-CORE PROCESSOR CIRCUITRY INCLUDING BUFFER CIRCUITRY

BACKGROUND

Maintaining power consumption proportional to delivered performance is a common metric by which processors are measured. This is especially so with the increasing interest in the cost of running processors in many different environments, from portable devices such as smartphones and tablet computers to servers. With the increase in the number of cores included and increased integration of other components within a processor, the portion of a multicore processor outside of the cores begins to consume a larger part of the total processor power. However, power management techniques used to reduce power consumption of a core are not necessarily applicable to non-core portions of a processor. This is so, due to complex protocol dependencies in managing non-core power while the cores are executing.

DETAILED DESCRIPTION

Figure 1:
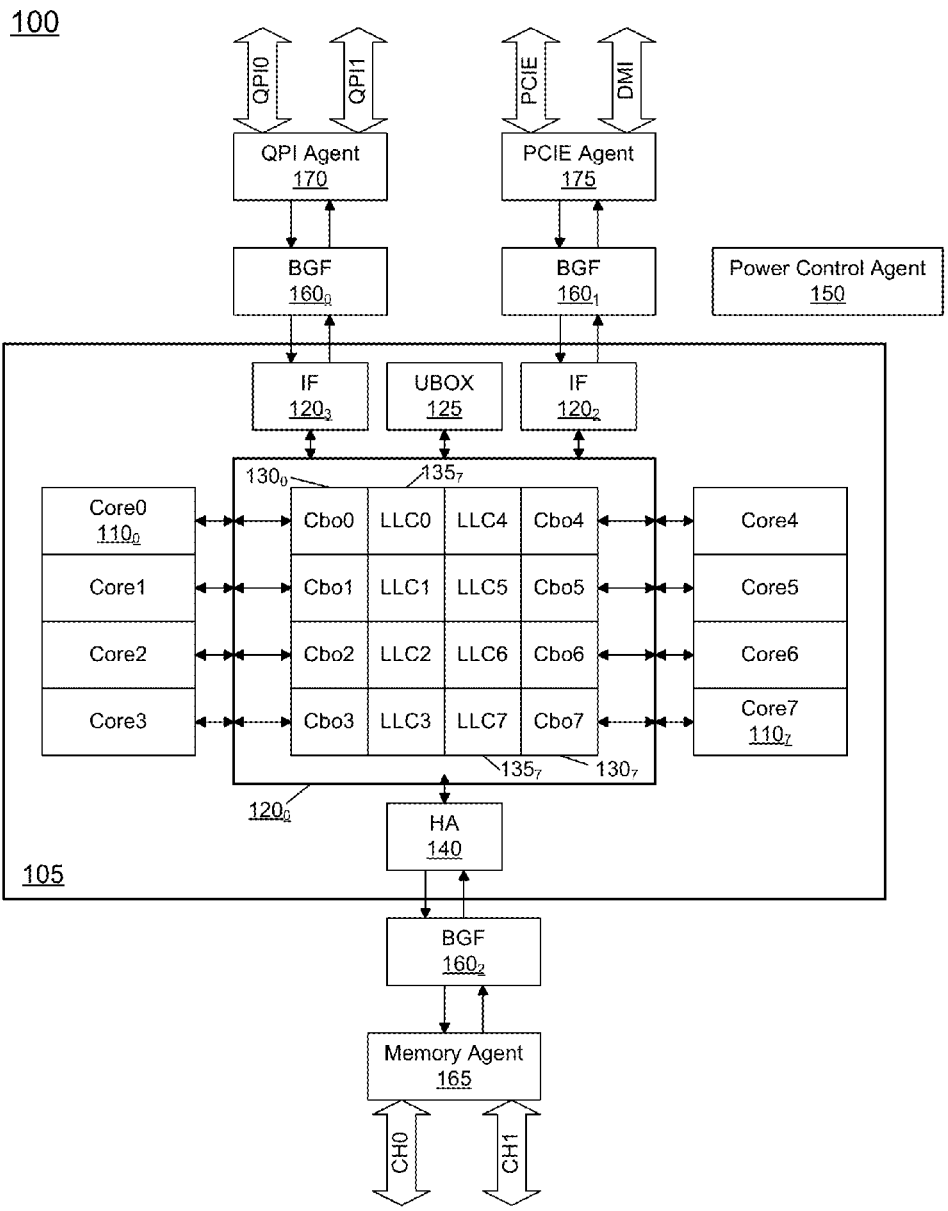
FIG. 1 is a block diagram of a processor in accordance with an embodiment of the present invention.

Embodiments may realize greater power management opportunities in a processor by dynamically scaling frequency and voltage of uncore components using a frequency change approach. As used herein, the terms "uncore" and "system agent" can be used interchangeably to refer to portions of a multicore processor outside of the cores themselves. As examples and not for purposes of limitation, such uncore components can include caches, power controllers, interconnect structures and so forth.

In one particular embodiment of a multicore processor, uncore components like a last level cache (LLC), cache controller, interconnect, memory coherency agent (e.g., a home agent), and an interrupt routing controller (referred to herein as a UBOX) can be included in a variable voltage/frequency domain. As used herein the term "domain" is used to mean a collection of hardware and/or logic that operates at the same voltage and frequency point. As an example, a multicore processor can include multiple domains such as a variable frequency domain and a fixed frequency domain. In other embodiments a processor can further include other non-core processing engines such as fixed function units, graphics engines, and so forth where at least some of these non-core elements are in an independent domain from a core domain.

Although many implementations of a multi-domain processor can be formed on a single semiconductor die, other implementations can be realized by a multi-chip package in which different domains can be present on different semiconductor die of a single package.

In embodiments in which at least some uncore circuitry is present in a variable frequency domain along with one or more cores, as the performance level of the cores in the processor decreases (by reducing operating frequency), so too can the frequency of the uncore components also be reduced. In one embodiment of a processor that has a thermal design power (TDP) of 95 watts (W), an additional approximately 7 W per processor can be saved as a performance level is reduced from P1 to Pn. In a dual processor system this can save as much as 15.5 W at the wall. These performance levels can be in accordance with the performance levels of an Advanced Configuration and Platform Interface (ACPI) standard (e.g., Rev. 3.0b, published Oct. 10, 2006). In general, the P1 performance state may correspond to a highest guaranteed performance state that can be requested by an operating system, while lower P-states can correspond to lower performance (and accordingly lower power) states.

Using an embodiment of the present invention, various non-core processor structures such as a LLC can have a frequency that scales together with core frequency. As the performance needs of the cores increase, this approach ensures that cache bandwidth (BW) increases while reducing the latency to memory. In this way, frequency scaling of performance for certain workloads can be improved. Memory latency can be reduced as the frequency of one or more cores is increased when a corresponding LLC/cache controller and uncore interconnect frequency is also increased. Thus scaling frequency of an uncore portion of a processor adds to the performance of the processor.

Although scaling uncore frequency/voltage with performance needs can save power, there can be difficulties as there is much complexity of the protocol dependencies in an uncore. Conventional frequency change flows completely drain all transactions from the domain whose frequency is to be changed. Thus in a conventional frequency change flow, the flow fully resolves dependencies between multiple transactions in the uncore. The flow first completes the transaction (s) that have no dependencies upon other transactions and then completes the transactions dependent on the first set of transactions. This dependency chain is resolved until all transactions in the domain are drained. This approach is quite straightforward when there are one or two sources of transactions. However in a multicore processor and multiprocessor systems, the uncore is the meeting point for a large number of transactions from multiple sources. Furthermore, integration of additional components within the uncore makes this challenge even more complex. And, depending on the type of the source and transaction, there can be ordering requirements between transactions. As such, according to a conventional operation, a complete drain flow of the uncore in a multiprocessor system causes the multiprocessor and multicore interconnect to be drained. This drain flow not only takes a long time (thus degrading performance), it is also prone to deadlock and livelock. This is so, as transactions being drained may have dependencies with transactions on another socket, and inter-transactional dependencies can make the process prone to deadlock.

Accordingly, in various embodiments, uncore frequency can be scaled without performing a full drain of the domain. Instead, a global clock synchronization may be performed to change frequency.

Referring now to FIG. 1, shown is a block diagram of a processor in accordance with an embodiment of the present invention. As shown in FIG. 1, processor 100 may be a multicore processor including a plurality of processor cores $110_0$-$110_7$. Although shown with 8 cores in the embodiment of FIG. 1, understand the scope of the present invention is not limited in this regard. As seen, both processor cores 110 and other circuitry may be present in a variable frequency plane 105 of the processor. As used herein, the terms "plane" and "domain" are interchangeable and used to mean a collection of hardware and/or logic that operates at the same voltage and frequency point. In various embodiments, multiple domains can be present, each independently controllable to operate at a variable or fixed frequency and voltage.

With regard to FIG. 1, the circuitry present in variable plane 105 other than the processor cores may correspond to different portions of a system agent or uncore logic. Specifically in the embodiment of FIG. 1, this circuitry may include various interconnect structures, cache controllers, agents and so forth. Namely a ring interconnect $120_0$ may couple the cores together and may further couple to cache circuitry including a cache controller formed of individual cache controller logics $130_0$-$130_7$, each of which can be coupled to a corresponding cache block $135_0$-$135_7$, each of which can be a last level cache bank for a corresponding core.

As further seen, ring interconnect $120_0$ may further couple to other interconnect structures, namely interconnect $120_2$ which can in turn communicate with an on-chip agent 175 (e.g., a Peripheral Component Interconnect Express (PCI Express™ (PCIe™)) agent in accordance with the PCI Express™ Specification Base Specification version 2.0 (published Jan. 17, 2007)) via a bubble generator buffer (BGF) logic $160_1$. In turn, this agent can communicate with off-chip devices, e.g., via a PCIe™ interconnect or a direct media interface (DMI) interconnect. And another interconnect $120_3$ can communicate with an agent 170 (e.g., an agent to communicate according to a Quick Path Interconnect (QPI)™ specification protocol available from Intel Corporation, Santa Clara, Calif.) via a BGF $160_0$ that in turn can communicate off-chip via one or more QPI™ links. Ring $120_0$ further communicates with a UBOX 125 and a home agent 140.

Note that the interconnection between components within variable frequency plane 105 and components outside this plane may be via a given bubble generator first-in-first-out (FIFO) buffer (BGF) $160_0$-$160_2$. Thus as seen, home agent 140 may communicate with a memory agent 165 via BGF $160_2$. Variable frequency plane 105 is connected to the other planes through clock domain crossings that can be controlled by bubble generator buffer logic, which can be implemented using FIFO buffers and corresponding logic, referred to herein as a BGF.

As further seen, a power control unit (PCU) 150 may further be present outside this variable frequency plane. In various embodiments, PCU 150 may perform various power control functions and furthermore may perform the actions to implement frequency changes within variable frequency plane 105 in accordance with an embodiment of the present invention.

Figure 2:
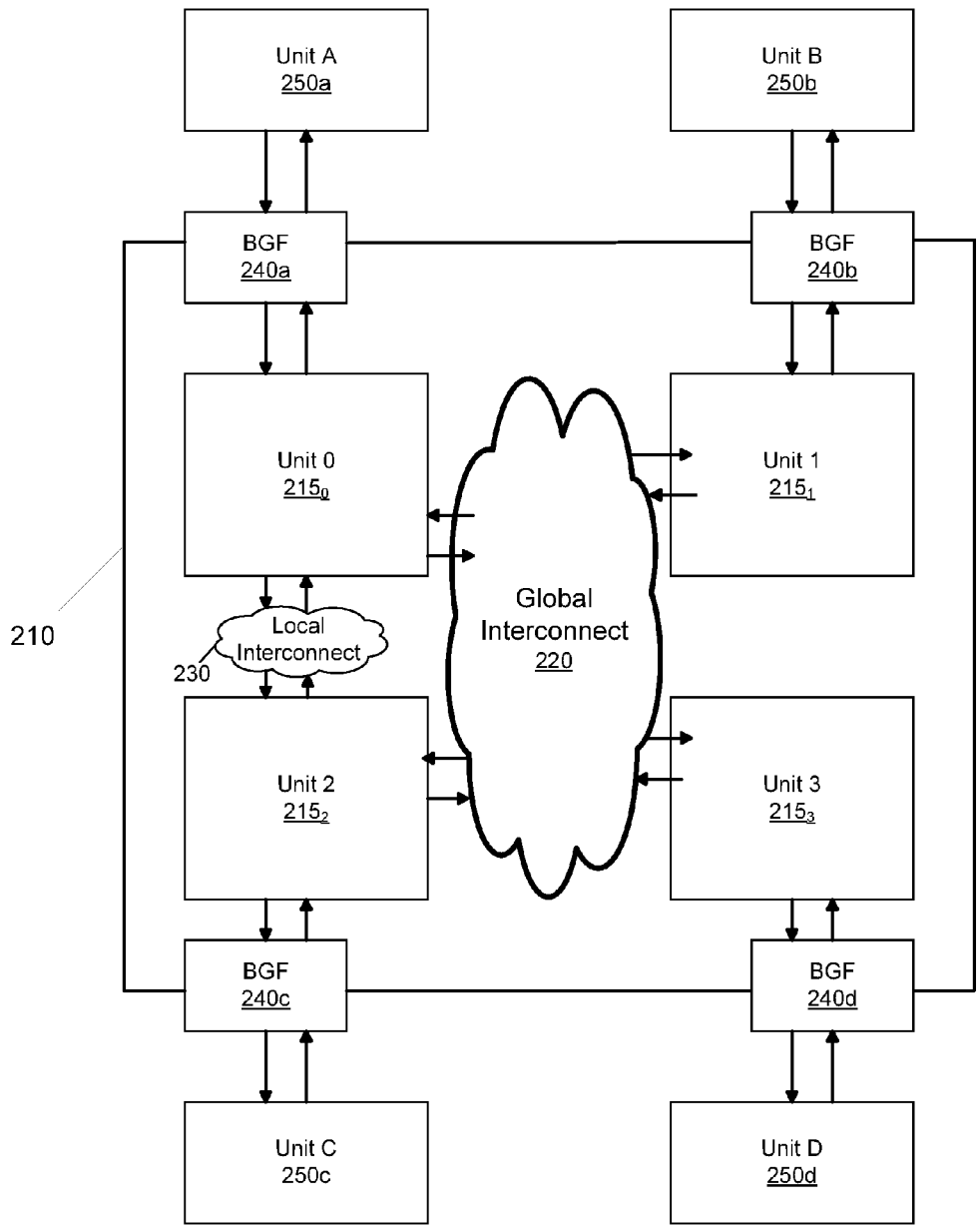
FIG. 2 is a block diagram of a variable frequency plane surrounded by other frequency planes in accordance with one embodiment of the present invention.

In various embodiments, a freeze mode may be provided for the variable frequency domain of the uncore. Instead of draining the transactional state, this freeze mode aims to empty and block all interfaces to the variable frequency domain and rely on synchronized clock gating to change the frequency of the variable frequency domain. In order to illustrate the concept, a variable frequency plane surrounded by other frequency planes is shown in FIG. 2. As seen in FIG. 2, a variable frequency plane 210 of a processor 200 may couple to other frequency planes, namely frequency planes 250a-250d, each of which can include one or more agents that can operate at a given frequency plane. As seen, to perform clock crossings between variable frequency plane 210 and any of these other frequency planes 250, a corresponding BGF 240a-240d may be present.

Within variable frequency plane 210 a plurality of units $215_0$-$215_3$ may operate at the same frequency. As seen, these various units can communicate with each other via a global interconnect 220. In addition, point-to-point interconnects can couple individual units. For example, in the embodiment shown in FIG. 2, unit $215_0$ may be coupled to unit $215_2$ via a local interconnect 230. Although shown with this particular implementation in the embodiment of FIG. 2, understand the scope of the present invention is not limited in this regard. Localized draining is used to ensure the BGFs do not have transactions in progress while the frequency is being changed. The global interconnect and local interconnect, and units $215_0$-$215_3$ and units 250a-250d however, are not drained. Thus in FIG. 2, units $215_0$-$215_3$ are in a single frequency plane. They are connected to units 250a-250d respectively using clock crossing FIFOs, namely BGFs 240a-d. Although the scope of the present invention is not limited in this regard, in some embodiments units 215 can be cores and/or other processing units. And these units can maintain their pending transactions and state during a freeze mode, as can units 250.

In one embodiment, to change the frequency of a variable domain using a freeze flow, the domain may satisfy the following conditions. First, the BGFs that perform the clock crossings are not back pressurable; this implies that if a transaction is injected on one side of the BGF, there should be a corresponding location available on the other side, so the BGF is guaranteed to be drained. Second, the clock architecture in the domain may be configured such that all clocks in the domain can be stopped at the same clock edge. If the plane has multiple phase lock loops (PLLs), a broadcast mechanism may be provided to synchronously gate the outputs of all PLLs in the domain. Note that this concurrent clock stopping (and starting) of every clock in the variable frequency domain on exactly the same clock avoids the need to drain all transactions. This is so, as in-flight transactions are not corrupted when the clocks are restarted. In addition to stopping and starting all the clocks on the same clock edge, this clock control may also be performed with the same alignment to global clocks in order to maintain determinism and global (processor-wide) functions with the same clock alignments both before and after a frequency change.

Figure 3:
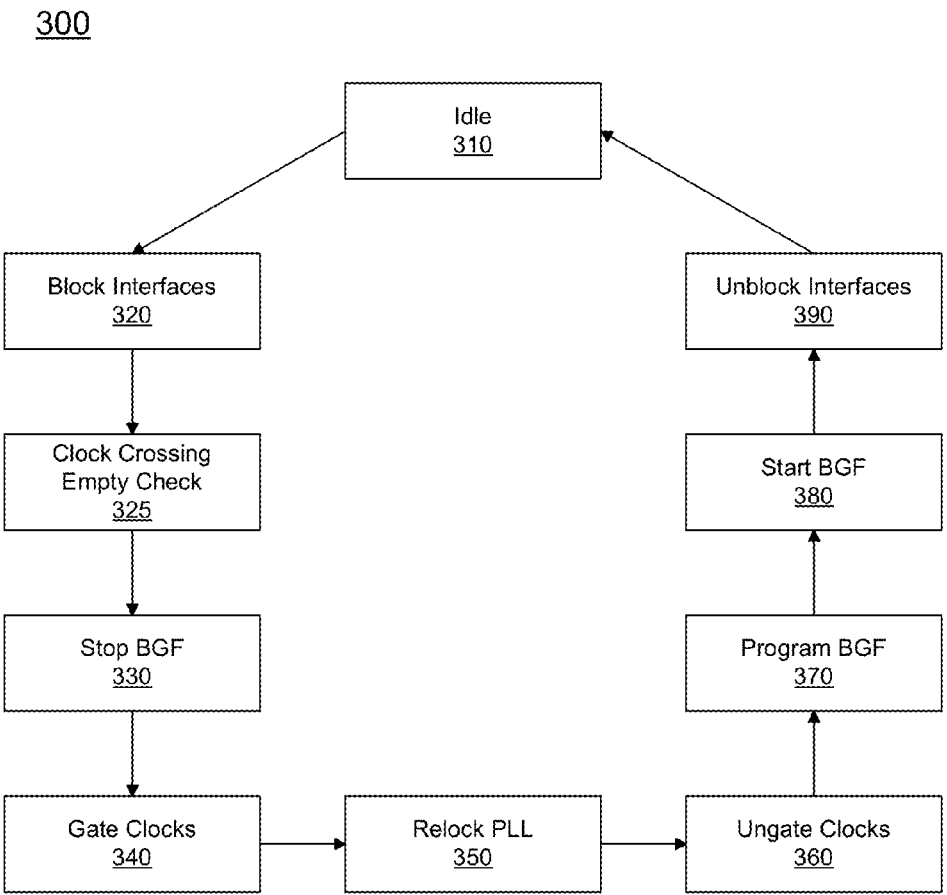
FIG. 3 is a flow diagram of a freeze flow state machine in accordance with one embodiment of the present invention.

Once the above preconditions have been met, control logic such as a centralized controller can implement a freeze-based flow in accordance with an embodiment of the present invention. Referring now to FIG. 3, shown is a flow diagram of a freeze flow state machine 300 in accordance with one embodiment of the present invention.

This state machine can be implemented in one embodiment by logic of a PCU and related logic within the variable frequency domain. For example, a master state machine may be present in the PCU, and sub-state machines can be associated with various components, both within and outside of the variable frequency domain. As seen in FIG. 3, method 300 can begin operation from an idle state (block 310). Control then passes to a block interface state (block 320). In general, during the block interface state 320, the controller can send a broadcast block message to all units at the boundary of the frequency domain. In the embodiment of FIG. 2, this would be units $215_0$-$215_3$ and units $250_a$-$250_d$ respectively. This block message can be sent independently of the BGFs using a global interconnect. On receiving the message, these units will block all their transmissions into the BGFs. Note however that the units may continue to receive messages from the BGFs. Responsive to receipt of this block message and the corresponding control of the unit to block its transmissions, each unit then sends an acknowledge to the controller that it successfully blocked transmission. After some time (which may be dependent on the depth of the BGFs and the lowest frequency of the receiving domain, and may be on the order of between approximately 4-8 bus clock cycles), the BGFs will become empty and stay empty. Namely, the BGFs remain empty since no further transactions are allowed into them due to the blocking.

In general during the clock crossing empty check state 325, the controller can send a "BGF Empty Check" message to all units at the boundary (units $215_0$-$215_3$ and units $250_a$-$250_d$ respectively in the embodiment of FIG. 2). Responsive to this message, each unit acknowledges the "BGF Empty Check" message by sending a corresponding acknowledgment message, which in one embodiment may be a "BGF is Empty" acknowledge message to the controller. Once all boundary units acknowledge that the corresponding BGF is empty, the controller can determine that all clock crossings are blocked and empty. Control thus passes to a stop BGF state.

In general during stop BGF state 330, the controller can send a "BGF Stop" command to all boundary units. Responsive to receipt of this command, all BGFs will be stopped. Stopping the BGFs can be effected by deasserting a run signal, which in turn causes deassertion of write and read enable signals on the BGF. Thus at this time, the uncore may be in a state in which its frequency can be changed. Accordingly, control passes to a gate clocks state 340 in which the controller sends a "Clock Gate" command to all PLLs or clock spines in the domain. Responsive to this command, the entire domain can be stopped on exactly the same clock edge. That is, logic associated with the PLLs or in the clock spine operates to gate all clocks in the domain at the same clock edge. In general the "clock gate" command can be received by each clock control circuit within a window, and sub-state machine logic of each such circuit can select a common, deterministic clock edge at which to stop its corresponding clock. Next, at a PLL relock state 350, the controller issues commands to cause PLLs in the domain to relock to the new frequency. Thereafter, at an ungate clocks state 360, the controller can send a "Clock Ungate" command to all PLLs or clock spines in the domain. Responsive to this command, logic at the PLLs or clock spines may cause all clocks in the domain to be ungated at the same clock edge.

Control passes next to a program BGF state 370, in which the controller can send a command to reprogram the BGFs at all units. This is so, since the domain is now set to a new frequency, the BGF configuration may also be changed. After this command is sent, a start BGF state 380 is entered in which the controller sends a command to start all the BGFs. Finally, at an unblock interfaces state 390, the controller sends a command to "Unblock" all traffic to the boundary units. Thus at this point, the frequency transition to the new frequency has been completed. Note that the above-described flow diagram of FIG. 3 is a generalized flow to perform a frequency change using a freeze operation. However, understand the scope of the present invention is not limited in this regard and depending on a given processor implementation, different specific manners of performing a freeze operation to change uncore frequency can occur.

Figure 4:
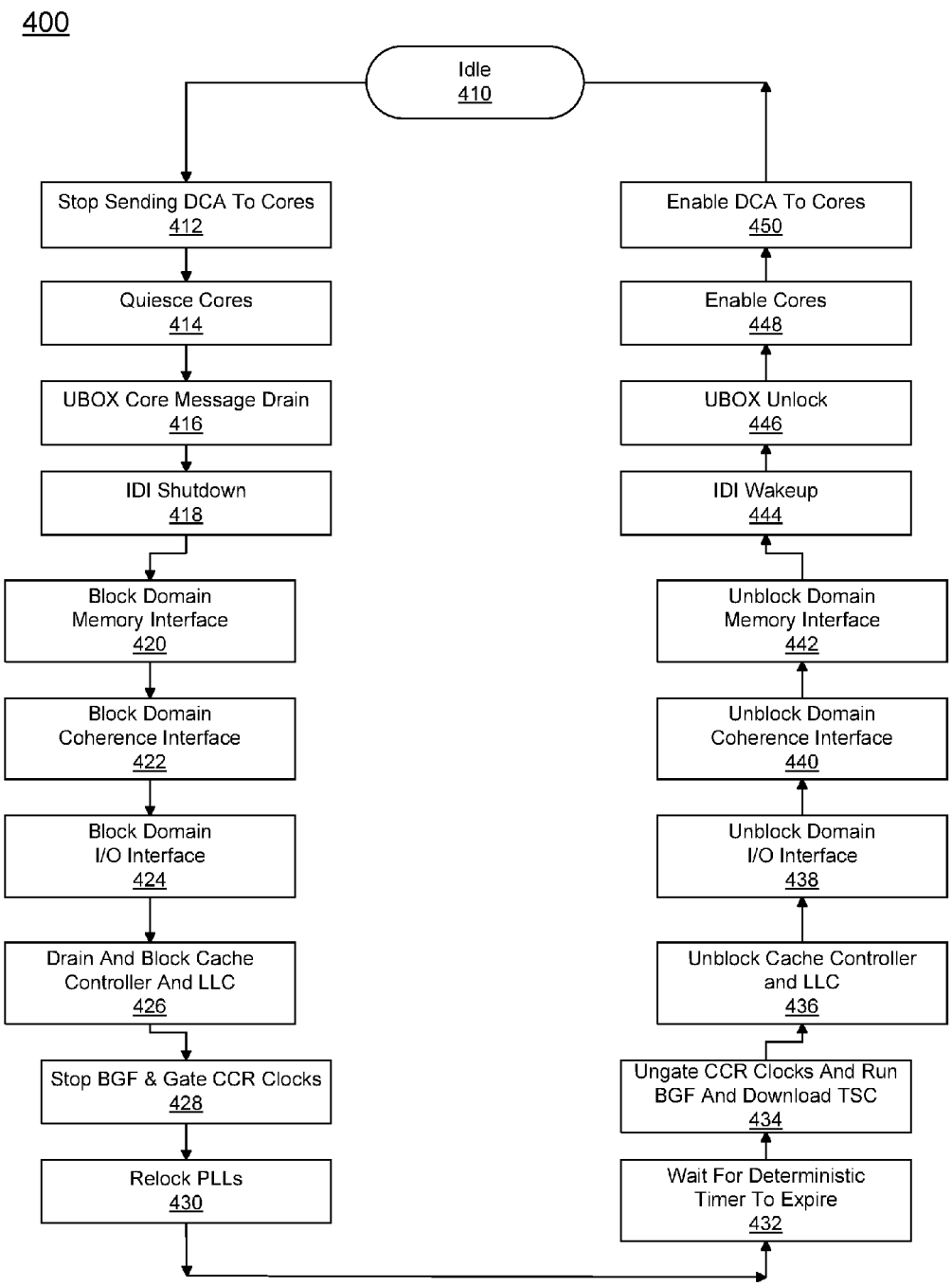
FIG. 4 is a flow diagram of a freeze flow method in accordance with a particular embodiment of the present invention.

Referring now to FIG. 4, shown is a flow diagram for a freeze flow implementation in accordance with a particular embodiment of the present invention. The flow may generally begin with operations to drain one or more cores of the processor, and thereafter a freeze-based variable frequency flow can be used to change frequency in at least a portion of an uncore present in a variable frequency plane. Note however, that in other embodiments, a similar modularization of a core into different units with clock crossings between them may be present. In this way, draining the core of transactions can also be avoided, and instead only buffers or other structures between modular units of the core can be drained.

As shown in FIG. 4, freeze flow 400 may begin when a processor is in an idle state 410. Control next passes to block 412 where direct cache access (DCA) messages can be stopped from being sent to various cores. Note that this and the other operations described for the freeze flow can be implemented by a request originating from a given agent and an acknowledgement back from a destination of the request to the requesting agent. As an example, a power control unit can initiate this request to a corresponding cache controller or other such logic and accordingly receive an acknowledgment in return.

Next responsive to this acknowledgment, the controller can quiesce all cores (block 414). In one embodiment, the cores can be drained by executing a fence instruction to ensure that all previous transactions are completed before retirement of the fence instruction, at which point issuance of new instructions is stopped. Responsive to receipt of an acknowledgment of this request, the UBOX core can be drained of its messages (block 416). On acknowledgement of this operation an interdie interconnect (IDI) such as a ring interconnect can be shut down (block 418). Then responsive to acknowledgement of this request, a memory interface between a memory controller and the variable frequency plane can be blocked (block 420). Thereafter a coherence interface within the variable frequency domain can be blocked (block 422). Then an interface between the variable frequency domain and an I/O interface can be blocked (block 424). Thereafter a cache controller and last level cache can be blocked and drained (block 426). Thereafter, the BGF can be stopped and clocks of the variable frequency domain (e.g., core cache ring (CCR) clocks) can be gated (block 428).

Thus at this time, the variable frequency domain is ready to undergo a frequency change. After this operation, various PLLs can be relocked to a new frequency (block 430). After this operation, a delay or wait period can occur, which may be implemented for a predetermined amount of time, e.g., according to a deterministic timer (block 432). On expiration of this timer, various operations can be performed in the reverse order as discussed above to ungate, unblock and wake up or otherwise enable the various structures that were blocked, stopped or quiesced as above. First at block 434, the CCR clocks can be ungated, the BGF begins running, and a time stamp counter (TSC) is downloaded from the PCU. In this way, this timer value, which is updated during the frequency change on the variable frequency domain, is an accurate representation of the elapsed time. As seen in FIG. 4, operations in the reverse order may be performed in seriatim from block 434 to block 450. Accordingly, the frequency of the variable frequency domain can be changed by these various operations without draining at least the uncore portion of the variable frequency domain. At this point the new frequency is active and control returns to the idle state at block 410. Although described with this particular implementation in the embodiment of FIG. 4, understand the scope of the present invention is not limited in this regard.

Thus in various embodiments, rather than draining an entire variable frequency domain including both core portions and uncore portions, embodiments may perform a freeze operation to change frequency of an uncore variable frequency domain. In doing so, the complexity of performing a full drain flow, which can be subject to architectural flow dependencies, particularly in the context of a multi-socket system, can be avoided. Still further, embodiments provide a frequency change flow that is independent of the actual architectural components in the frequency domain. In other words, the freeze flow operation can be used regardless of transactional dependencies in the architecture, and thus is extensible to many different architectures. In addition, the freeze-based flow focuses only the boundaries of the variable frequency domain such that units inside the variable frequency domain that are not on the boundary can be completely unaware of the frequency change flow.

Figure 5:
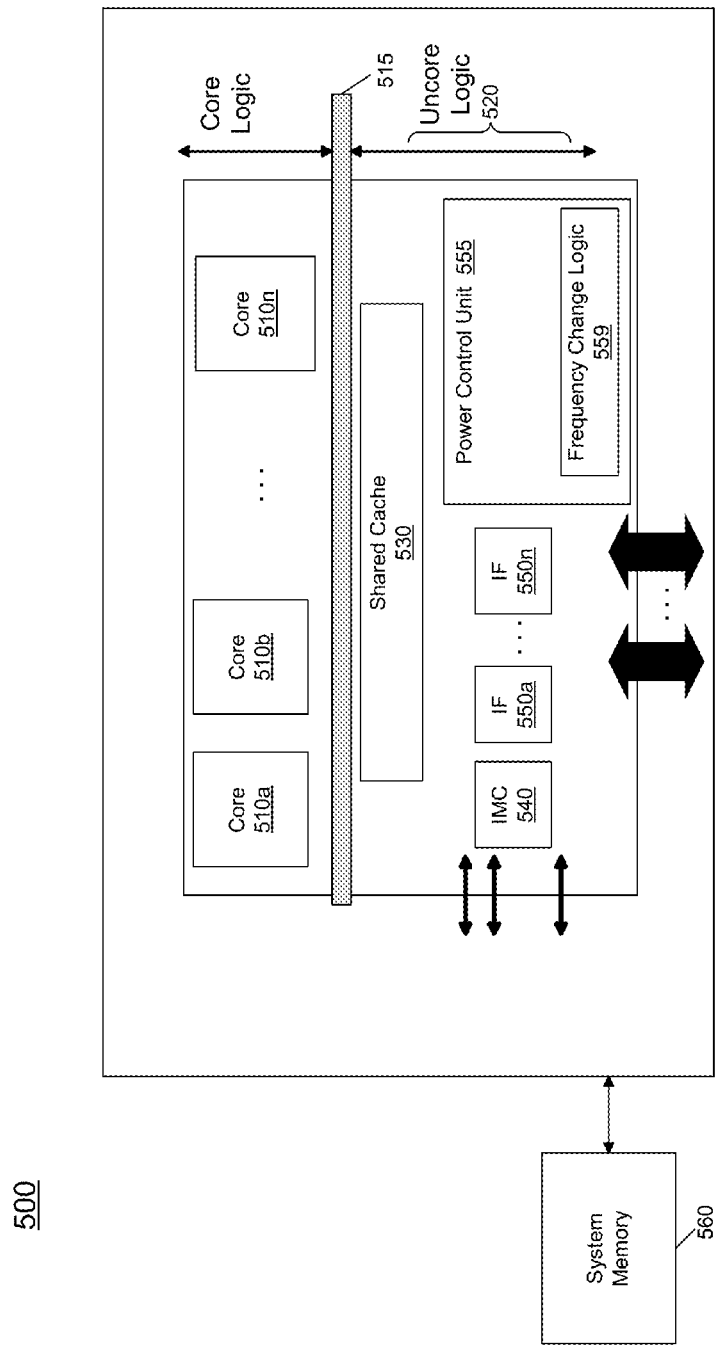
FIG. 5 is a block diagram of a processor in accordance with an embodiment of the present invention.

Referring now to FIG. 5, shown is a block diagram of a processor in accordance with an embodiment of the present invention. As shown in FIG. 5, processor 500 may be a multicore processor including a plurality of cores $510_a$-$510_n$. In one embodiment, each such core may be of an independent power domain and can be configured to operate at an independent voltage and/or frequency, or the cores can all be of a single domain. The various cores may be coupled via an interconnect 515 to a system agent or uncore 520 that includes various components. As seen, the uncore 520 may include a shared cache 530 which may be a last level cache. In addition, the uncore may include an integrated memory controller 540, various interfaces 550 and a power control unit 555.

In various embodiments, power control unit 555 may include frequency change logic 559, which may be a logic to initiate control of a frequency change operation for one or more variable frequency domains of the processor, which can be performed without draining the domains of transactions, as described above.

With further reference to FIG. 5, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 5, the scope of the present invention is not limited in this regard. For example, although uncore logic 520 is shown as being logically separate from a core domain, understand that as described above, much of the uncore, with the exception of PCU 555 may be located in a variable frequency domain with one or more cores.

Figure 6:
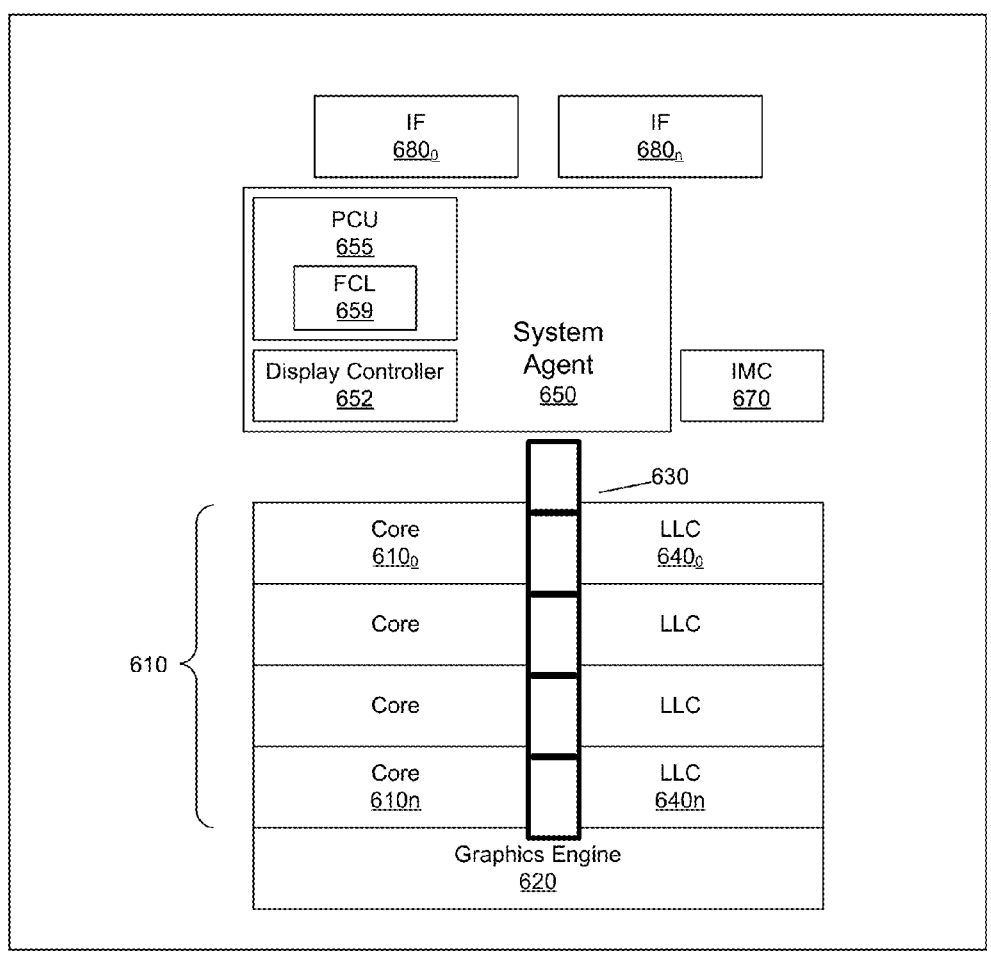
FIG. 6 is a block diagram of a multi-domain processor in accordance with another embodiment of the present invention.

Referring now to FIG. 6, shown is a block diagram of a multi-domain processor in accordance with another embodiment of the present invention of the present invention. As shown in the embodiment of FIG. 6, processor 600 includes multiple domains. Specifically, a core domain 610 can include a plurality of cores $610_0$-$610n$, a graphics domain 620 can include one or more graphics engines, and a system agent domain 650 may further be present. In various embodiments, a power control portion of system agent domain 650 may execute at a fixed frequency and may remain powered on at all times to handle frequency change events and power management such that domains 610 and 620 can be controlled to dynamically have their frequency changed without draining transactions present with the domains.

Note that while only shown with three domains, understand the scope of the present invention is not limited in this regard and additional domains can be present in other embodiments. For example, multiple core domains may be present each including at least one core. In this way, finer grained control of the amount of processor cores that can be executing at a given frequency can be realized.

In general, each core 610 may further include low level caches in addition to various execution units and additional processing elements. In turn, the various cores may be coupled to each other and to a shared cache memory formed of a plurality of units of a last level cache (LLC) $640_0$-$640_n$. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent circuitry 650. Although not shown for ease of illustration, understand that additional portions of uncore circuitry can be included in core domain 610.

In the embodiment of FIG. 6, system agent domain 650 may include display controller 652 which may provide control of and an interface to an associated display. As further seen, system agent domain 650 may include a power control unit 655 which can include a frequency change logic 659 in accordance with an embodiment of the present invention. In various embodiments, this logic may execute algorithms such as shown in FIGS. 3 and 4 to thus dynamically change a frequency of one or more domains of a processor.

As further seen in FIG. 6, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one DMI interface may be provided as well as one or more PCIe™ interfaces. Still further, to provide for communications between other agents such as additional processors or other circuitry, one or more interfaces in accordance with a QPI™ protocol may also be provided. Although shown at this high level in the embodiment of FIG. 6, understand the scope of the present invention is not limited in this regard.

Figure 7:
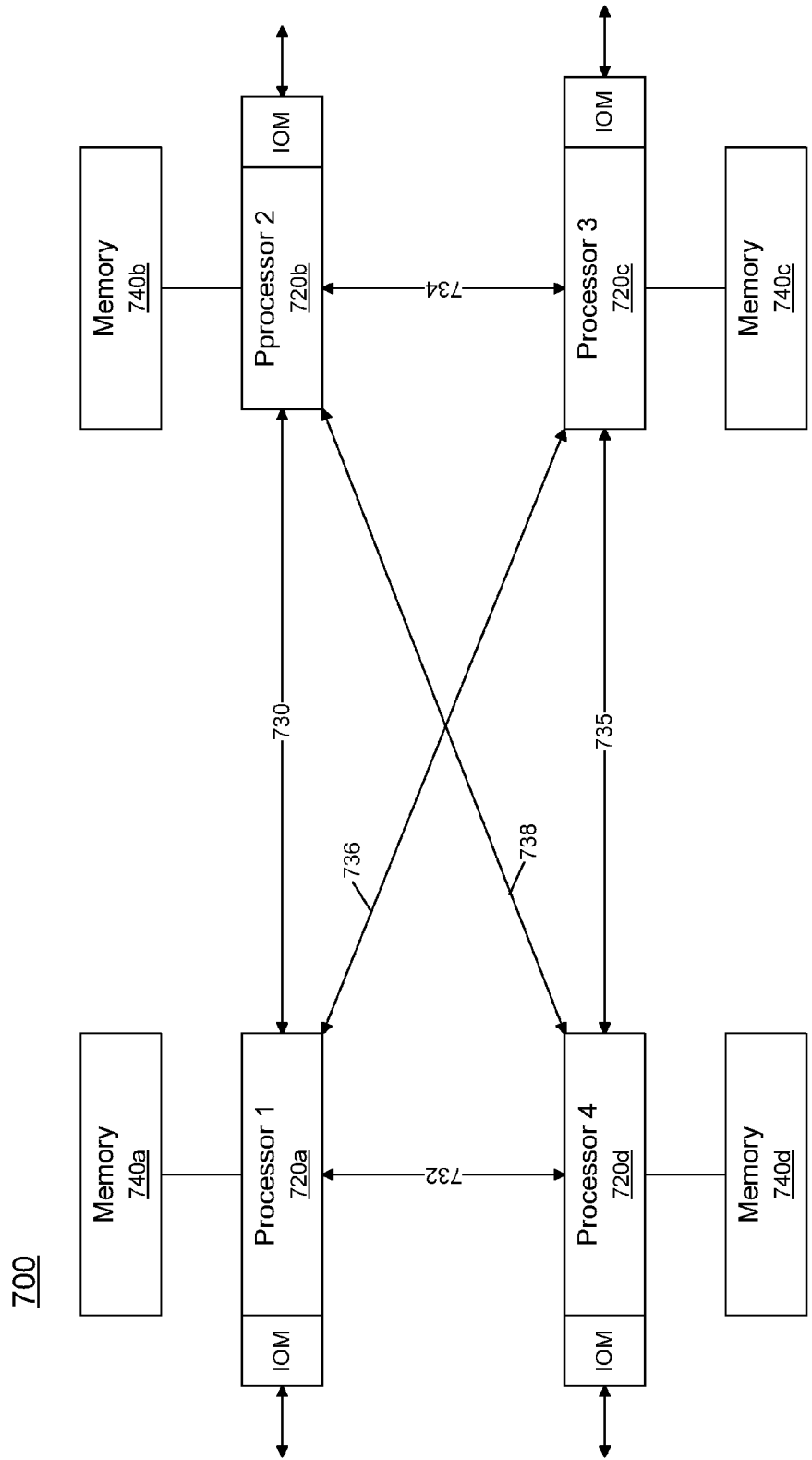
FIG. 7 is a block diagram of a system in accordance with another embodiment of the present invention.

Embodiments can be implemented in many different systems, ranging from mobile devices such as smartphones, tablet computers and so forth, to multiprocessor server systems. FIG. 7 is a block diagram of a system that may be coupled together via PtP interconnects. As shown in FIG. 7, system 700 may include multiple processor sockets, namely processor sockets 720a-720d (generically processor socket 720). Each processor socket may be a multicore processor that can perform dynamic frequency control in accordance with an embodiment of the present invention. As seen, each processor 720 can include a memory controller to interface with a corresponding portion of local memory 740a-d, and an I/O master to interface with one or more peripheral devices (not shown for ease of illustration in FIG. 7).

To enable communication between the various processor of system 700, various point-to-point interconnects may be present to couple the components together. Specifically, as shown in FIG. 7, each processor socket 720 may include an interface to three links to the other processor sockets. Accordingly, first processor socket 720a may provide an interface to links 730, 732, and 736 between itself and second, third, and fourth processor sockets 720b-d. Similarly, second processor socket 720b is coupled to third and fourth processor sockets 720c and 720d via interconnects 734 and 738, respectively. Similarly, third and fourth processor sockets 720c and 720d are coupled via an interconnect 735. While described with this particular implementation in the embodiment of FIG. 7, it is to be understood that the scope of the present invention is not so limited.

Figure 8:
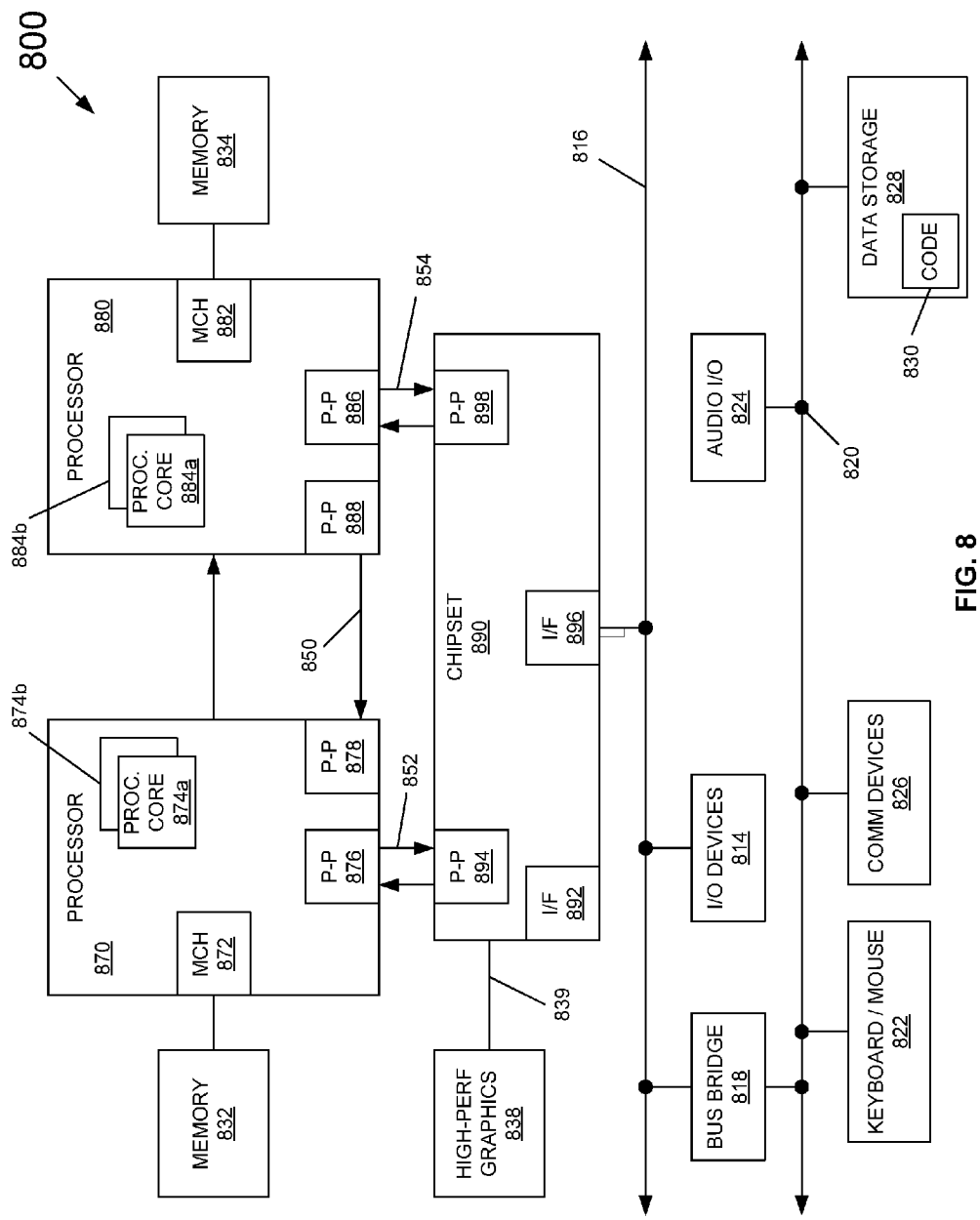
FIG. 8 is a block diagram of a system in accordance with an embodiment of the present invention.

Another system type in which embodiments can be used is shown in FIG. 8. As seen, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. Each of the processors can include a PCU or other logic to perform frequency changes to one or more domains of the processor, as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can beO incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A multicore processor comprising:
a variable frequency domain including a plurality of cores and a first portion of system agent circuitry separate from the plurality of cores, the first system agent circuitry portion including at least one cache memory, at least one cache controller, and an interconnect structure; and
at least one fixed frequency domain including a power control unit (PCU), a first agent to communicate with one or more off-chip devices, a second agent to communicate off-chip via one or more links, and a memory agent, wherein the PCU is to cause a frequency change to the variable frequency domain while maintaining and without draining the first system agent circuitry portion of pending transactions from a plurality of sources including at least one of the plurality of cores, the first and second agents and the memory agent, and to enable a concurrent frequency change to the at least one cache memory and the plurality of cores so that a frequency of the plurality of cores scales with a frequency of the at least one cache memory, the at least one cache memory comprising a last level cache.

2. The multicore processor of claim 1, wherein at least some of the pending transactions have dependencies on other transactions.

3. The multicore processor of claim 1, further comprising an interface to couple the variable frequency domain to a first fixed frequency domain of the multicore processor, wherein the PCU is to drain the interface and to block the interface and to thereafter enable the frequency change to the variable frequency domain.

4. The multicore processor of claim 3, wherein the interface comprises a bubble generator buffer.

5. The multicore processor of claim 3, wherein the PCU is to execute a freeze mode to block the interface during the frequency change, wherein in the freeze mode, the PCU is to prevent the first fixed frequency domain and the variable frequency domain from sending a transaction into the interface.

6. The multicore processor of claim 1, wherein the variable frequency domain includes a global interconnect to couple a plurality of units of the variable frequency domain and a local interconnect comprising a point-to-point interconnect to couple a first unit and a second unit of the plurality of units.

7. The multicore processor of claim 1, wherein the PCU is to gate a plurality of clocks of the variable frequency domain at a common clock edge and to thereafter enable the frequency change.

8. A method comprising:
quiescing a plurality of cores of a first frequency domain of a processor;
blocking a plurality of interfaces between the first frequency domain and a second frequency domain of the processor:
blocking a first unit in the first frequency domain from sending transactions to a boundary unit coupled between the first frequency domain and the second frequency domain responsive to a block signal from a power control unit (PCU) of the processor;
receiving an acknowledgement from the first unit that the first unit has blocked sending the transactions to the boundary unit responsive to the block signal;
stopping the boundary unit responsive to determining that the boundary unit is empty of transactions; and
gating a plurality of clocks of the first frequency domain on a common clock edge and changing a frequency of the plurality of clocks from a first clock frequency to a second clock frequency, without draining the first unit of transactions.

9. The method of claim 8, wherein the first unit comprises a system agent unit of the processor.

10. The method of claim 8, wherein the first unit comprises a last level cache (LLC) and further comprising changing a frequency of the LLC and a core associated with the LLC from the first clock frequency to the second clock frequency.

11. The method of claim 8, wherein changing the frequency of the plurality of clocks includes reloading a plurality of phase lock loops (PLLs) from the first clock frequency to the second clock frequency.

12. A system comprising:
- a first multicore processor including a variable frequency domain having a plurality of cores and system agent circuitry separate from the plurality of cores, and a power control unit (PCU) including a frequency control logic to cause a frequency of the variable frequency domain to change without draining the variable frequency domain of pending transactions received from a plurality of sources, stop a plurality of clocks of the variable frequency domain at a common clock edge, and update a frequency of the variable frequency domain while the plurality of clocks are stopped;
- a second multicore processor coupled to the first multicore processor; and
- a first portion of a system memory coupled to the first multicore processor and a second portion of the system memory coupled to the second multicore processor.

13. The system of claim 12, wherein at least one pending transaction issued from the second multicore processor to the first multicore processor remains within a unit of the variable frequency domain of the first multicore processor during the frequency change.

14. The system of claim 12, wherein the frequency control logic is to block a first unit in the variable frequency domain from sending transactions to a boundary unit coupled between the variable frequency domain and a second frequency domain of the first multicore processor during the frequency change.

15. The system of claim 14, wherein the frequency control logic is to stop the boundary unit responsive to determining that the boundary unit is empty of transactions.

16. The system of claim 15, wherein the frequency control logic is to send a block signal to the first unit to block the first unit from sending the transactions to the boundary unit and receive an acknowledgement from the first unit that the first unit has blocked sending the transactions to the boundary unit responsive to the block signal.

17. The system of claim 16, wherein the frequency control logic is to quiesce the plurality of cores of the variable frequency domain, and block a plurality of interfaces between the variable frequency domain and the second frequency domain after receipt of acknowledgment of the block signal.

18. The system of claim 12, wherein the system agent circuitry comprises an uncore.

* * * * *